(12) United States Patent
Cournoyer et al.

(10) Patent No.: US 8,372,498 B2
(45) Date of Patent: Feb. 12, 2013

(54) COMPOSITE CORE DENSIFICATION

(75) Inventors: David M. Cournoyer, Seymour, CT (US); Nell W. Cawthra, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1398 days.

(21) Appl. No.: 11/957,909

(22) Filed: Dec. 17, 2007

(65) Prior Publication Data

US 2009/0155502 A1    Jun. 18, 2009

(51) Int. Cl.
 *B32B 1/08* (2006.01)
 *B32B 3/12* (2006.01)
 *B32B 3/26* (2006.01)
 *B32B 27/00* (2006.01)

(52) U.S. Cl. ............ 428/36.9; 428/35.7; 428/36.5; 428/118; 428/313.5; 428/314.2; 428/319.3

(58) Field of Classification Search ......... 428/34.1, 428/34.4–34.7, 35.7, 35.8, 36.1, 36.4, 36.5, 428/36.9, 77, 98, 114, 116–118, 304.4, 313.3, 428/313.5, 313.7, 313.9, 314.2, 318.4, 319.1, 428/319.3, 319.7, 319.9; 138/144, 150, 153, 138/154, 172, 174, 177, 178, 188

See application file for complete search history.

(56) References Cited

U.S. PATENT DOCUMENTS

| | | | | |
|---|---|---|---|---|
| 3,685,463 | A | * | 8/1972 | Francis ............... 108/56.3 |
| 4,643,940 | A | | 2/1987 | Shaw et al. |
| 5,256,230 | A | | 10/1993 | Winkel |
| 5,360,500 | A | * | 11/1994 | Evans et al. ............... 156/74 |
| 5,490,892 | A | | 2/1996 | Castagnos et al. |
| 5,547,737 | A | | 8/1996 | Evans et al. |
| 5,618,604 | A | | 4/1997 | Dohn |
| 5,716,476 | A | | 2/1998 | Dohn |
| 5,736,222 | A | * | 4/1998 | Childress ............... 428/119 |
| 6,077,376 | A | | 6/2000 | Katraro et al. |
| 6,218,005 | B1 | | 4/2001 | Moh |
| 6,346,689 | B1 | | 2/2002 | Willis et al. |
| 6,403,018 | B1 | | 6/2002 | Goretta et al. |
| 6,777,074 | B2 | | 8/2004 | Noda |
| 6,878,434 | B2 | | 4/2005 | Fujioka et al. |
| 7,037,865 | B1 | | 5/2006 | Kimberly |

FOREIGN PATENT DOCUMENTS

| | | |
|---|---|---|
| JP | 10-128473 | 5/1998 |
| JP | 2000-263668 | 9/2000 |
| KR | 20-0344647 | 3/2004 |

OTHER PUBLICATIONS

Entry for "paper" in Hawley's Condensed Chemical Dictionary, 14th Edition, John Wiley & Sons, Inc. 2002.*
Entry for "starch" in Hawley's Condensed Chemical Dictionary, 14th Edition, John Wiley & Sons, Inc. 2002.*
International Search Report for International Application No. PCT/US2008/084451 dated Jun. 8, 2009.

* cited by examiner

*Primary Examiner* — Walter B Aughenbaugh
(74) *Attorney, Agent, or Firm* — Carlson, Gaskey & Olds PC (57) ABSTRACT

A reinforcement tube for composite core densification and a composite article therewith.

13 Claims, 8 Drawing Sheets

COMPOSITE CORE DENSIFICATION

BACKGROUND

The present invention relates to composite articles, and more particularly to core densification.

Some composite articles incorporate a core such as honeycomb (HC) or foam for fabrication of various aerospace structures, such as panels, due to these core's advantageous strength to weight ratio. Such core composite articles include upper and lower composite skins, i.e., fiber reinforced resin matrix laminates that are separated and stabilized by the core layer.

In areas where fasteners are to be located, the core must be densified by either filling the HC core with an epoxy syntactic material or the incorporation of densely packed vertical pin densification for a foam type core. Either core densification limits fastener size to avoid core crush.

The HC core densification may require expensive hand work and is relatively heavy in weight. Provisions for fastener installation in composite sandwich structures are typically accomplished with an epoxy syntactic material at 45 lbs. per cu. ft. (pcf) to fill cells in a typical 3.0 pcf HC core. HC core details are often locally densified in a separate operation that may require machining and special bond preparation before the core detail can be assembled into a sandwich laminate. Furthermore, densification of curved core details may require significant tooling to maintain curvature during densification.

Vertical pin densification in foam type cores such as X-Cor™ or K-Cor™, is a pin insertion process typically performed at the core manufacturer. Pin densification in a 3.5 pcf or higher core is limited to 17 pcf as vertical pins may begin to interfere with X-Cor™ or K-Cor™ pins. A 17 pcf vertical pin densification with 4 ply face skins limits fastener size to approximately 5/32 inch diameter. Clamp-up loads for larger diameter fasteners may still crush the densified core and generally should not be utilized with vertical pin densification. The separate vertical pin insertion operation when manufacturing the core increases machine time. Furthermore, at highly loaded fastener locations in flare attachment areas, vertical pin densification may not efficiently transfer shear loads into the core.

Accordingly, it is desirable to provide localized densification of lightweight composite articles, e.g., to react significantly through fastener load.

SUMMARY

A reinforcement tube for composite core densification according to an exemplary aspect of the present invention includes at least one composite ply material strip in a coil configuration, said coil configuration defining a tube generally rectilinear in cross-section.

A composite article according to an exemplary aspect of the present invention includes a core, a reinforcement tube bonded to the core and a composite skin bonded to the core and reinforcement tube.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
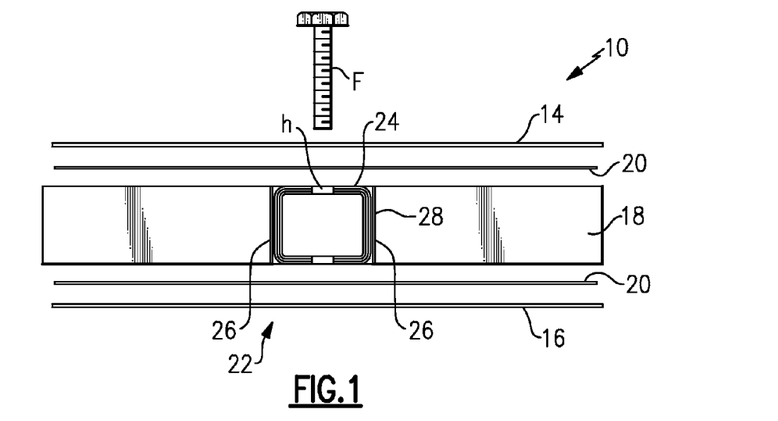
FIG. 1 is a sectional view of a composite panel having an exemplary reinforcement tube bonded therein.

Referring to FIG. 1, a lightweight core composite article 10 is illustrated in cross section. The composite article 10 includes a composite sandwich structure having a multiple of layers bonded together. The composite article 10 may be manufactured in a single step process using prepreg autoclave processing or resin infusion techniques, such as, for example, resin film infusion (RFI), or combinations of these techniques. It should be understood that various methods may be utilized to bond each layer to the adjacent layer and that various thicknesses (e.g., number of plies) within each layer may be utilized. It should be further understood that the composite article 10 may be but one portion of a structure such as a composite panel.

The composite article 10 generally includes composite skins 14, 16 and a core 18. The composite skins 14, 16 may be bonded to the core 18 through a respective film adhesive ply 20. The composite skins 14, 16 may alternatively be formed from uncured "prepreg" or "B-stage" laminates of orientated fiber reinforcement such as graphite, aramide or fiberglass fibers disposed in a binding matrix such as epoxy, phenolic or other similar organic resinous material for direct application to the core 18. The resin impregnated composite material is staged to form the ("tacky") composite material (prepreg).

The core 18 may be a honeycomb (HC) core or a foam core material such as K-Cor™ or X-Cor™ manufactured by Aztex, Inc. of Waltham, Mass. The K-Cor™ or X-Cor™ includes a multiple of pins within a lightweight carrier to form a truss-like support structure. The lightweight carrier may be a Rohacell® foam which is a 'closed cell' type foam that is resistant to ingress by water. The pins may be manufactured of a non-metallic material such as carbon, fiberglass, quartz, Kevlar, ceramics or other material which provide desired mechanical, electrical and magnetic properties. X-Cor™ is substantially similarly to K-Cor™ except X-Cor™ has sharp pin ends in order to at least partially pierce at least one ply of the composite skins 14, 16 to form a bond/mechanical lock therewith. The pins used in K-Cor™ are bent over and bonded to or between at least one ply of the composite skins 14, 16.

The HC core, X-Cor™ and K-Cor™ can be tailored, even within the same panel, to accommodate various core strength and stiffness requirements and are not restricted to that disclosed herein as any core material will benefit from the present invention.

Figure 2A:
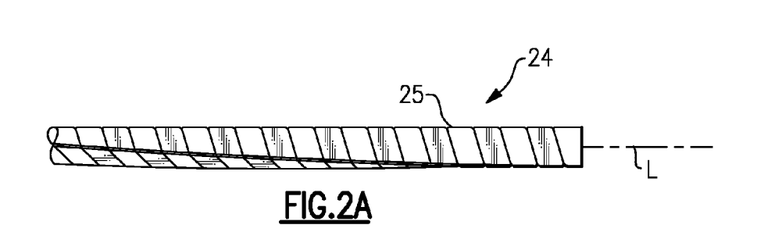
FIG. 2A is a perspective view of the reinforcement tube shown in FIG. 1.

Densification of the core 18 is often required in reinforcement areas where fasteners or preformed components transfer load into the composite article 10. The reinforcement area 22 provided herein includes a reinforcement tube 24 (also illustrated in FIGS. 2A-2B) that is in an exemplary embodiment co-cured into the composite article 10. The reinforcement tube 24 may be a precured segmented composite tube of comparable thickness to the composite article 10 sandwich structure core 18. Although illustrated as generally rectilinear in cross-section in the disclosed embodiment of FIG. 1, it should be understood that any cross-sectional shape may alternatively be utilized (FIGS. 3A-3D). It should be further understood that the reinforcement tube 24 may alternatively include a metallic material.

The reinforcement tube 24 generally forms a coil configuration (FIG. 2A) about a longitudinal axis L to form a box-shaped spring in the rectilinear cross-section embodiment. The coil configuration defines a generally helical opening 25 about axis L that permits multi-directional flexibility (FIG. 2B) along two or more axes which minimizes tooling to maintain curvature for densification of curved core articles and thereby minimizes labor and expense.

The reinforcement tube 24 may be bonded to various types of core 18, such as, but not limited to, HC core, X-Cor™ and K-Cor™. The reinforcement tube 24 may be bonded to the lightweight core material with a foaming adhesive 26 while the skin 14, 16 bond may be accomplished with the film adhesive ply 20 such as Hysol® materials manufactured by Henkel Corporation headquartered in Düsseldorf, Germany. It should be understood that various foaming and film adhesives as well as other bonding techniques may alternatively or additionally be utilized. The core mating surface 28 for a rectilinear reinforcement tube 24 may be prepared with a perpendicular edge cut. That is, the core mating surface 28 is cut in relationship to the reinforcement tube cross-sectional shape (FIGS. 3A-3D).

The reinforcement tube 24 supports the composite skins 14, 16 in the localized densification area to provide for load transfer to, in one embodiment, react a fastener f load. The reinforcement tube 24 essentially densifies a region of the composite article 10 such that a hole h can be formed to receive the fastener F. The fastener F, for example, allows the composite article 10 to be readily fastened to other structures.

Referring to FIGS. 4, 2B, and 5A-5D, the reinforcement tube 24 is generally manufactured by winding a strip 30 of composite ply laminate material such as composite prepreg around a mandrel M (FIG. 5A) in a spiral manner to define the generally helical opening 25 (FIG. 5B); cover the laminate material with peelply, release film, and ⅛" thick silicone rubber; insert temperature monitoring thermocouple; cure cycle per material manufacturer recommendations; remove expendable bagging materials and silicone rubber strips; remove resin flash; flex the reinforcement tube 24 to break resin between the windings (FIG. 2B); and remove peelply from part outer surface and lay-up directly into sandwich laminate of the composite article 10.

Figure 5A:
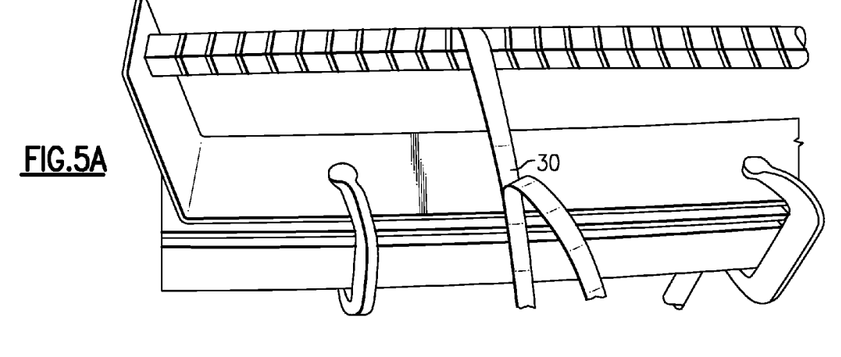
FIGS. 5A-5D are perspective views of steps within the manufacturing process flow of FIG. 4.
Figure 5B:
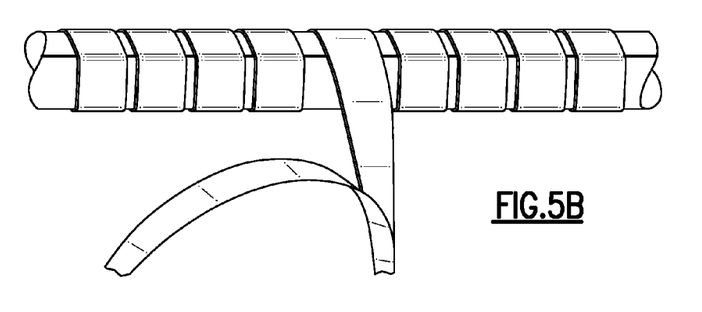
Figure 5C:
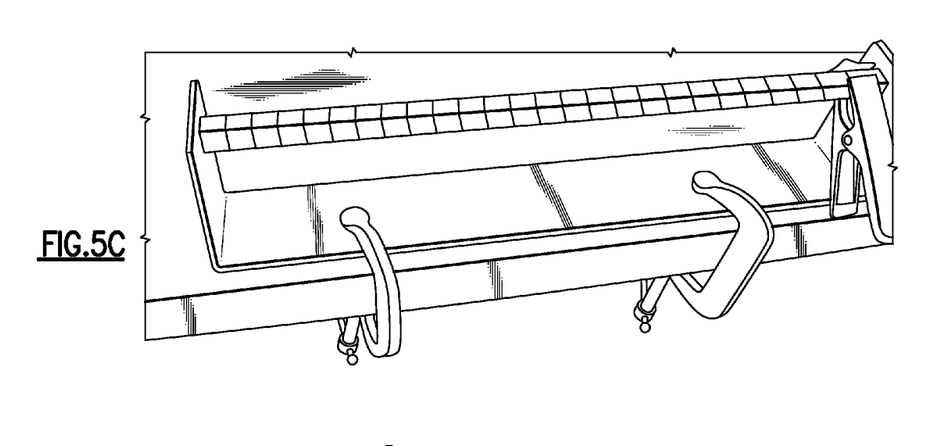
Figure 5D:
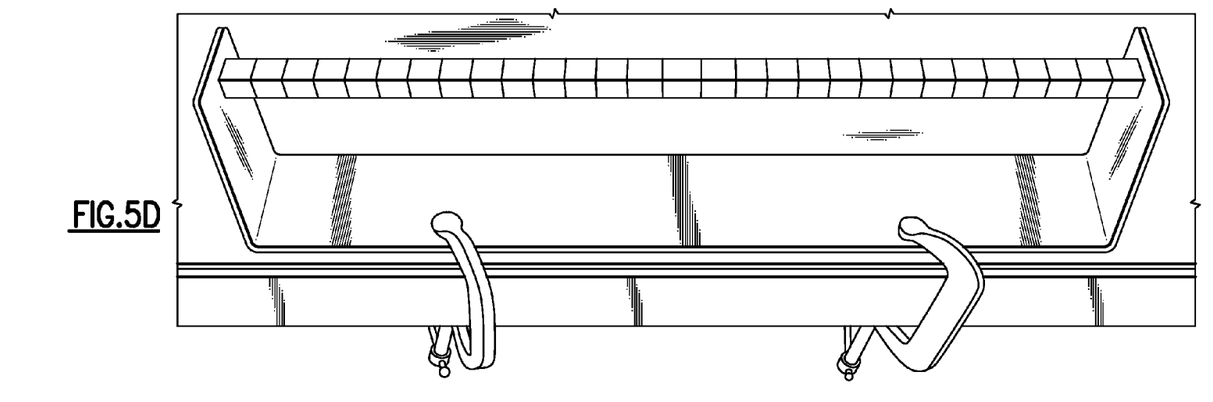

The reinforcement tube 24 is readily optimized for size, wall thickness, and lay-up configuration according to load requirements by providing an appropriate number of plies to build up the strip 30. It has been determined that the reinforcement tube 24, when manufactured on a straight rectilinear mandrel M, may result in a slightly twisted reinforcement tube after cure such that the mandrel M may include a slight counter-twist to produce a square reinforcement tube 24.

Figure 2B:
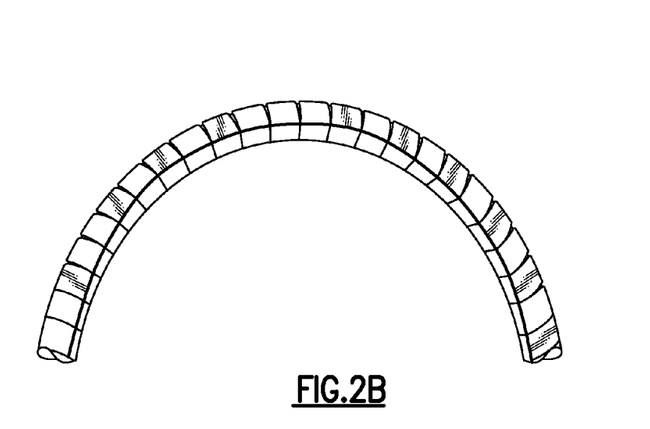
FIG. 2B is a perspective view of the reinforcement tube shown in FIG. 1 illustrating the multi-directional flexibility thereof in an exemplary embodiment.
Figure 3A:
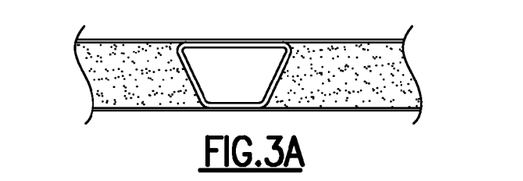
FIGS. 3A-3D are cross-sectional views of various exemplary reinforcement tube cross-sectional shapes.
Figure 3B:
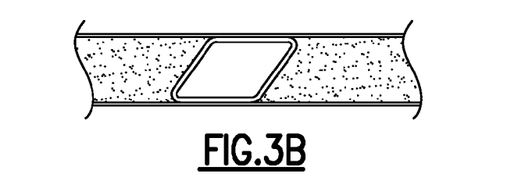
Figure 3C:
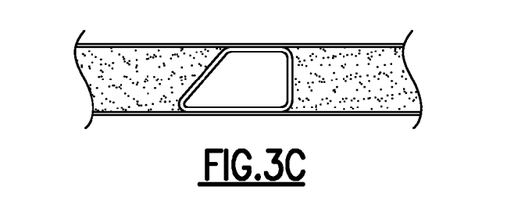
Figure 3D:
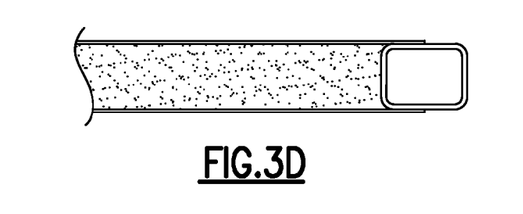
Figure 4:
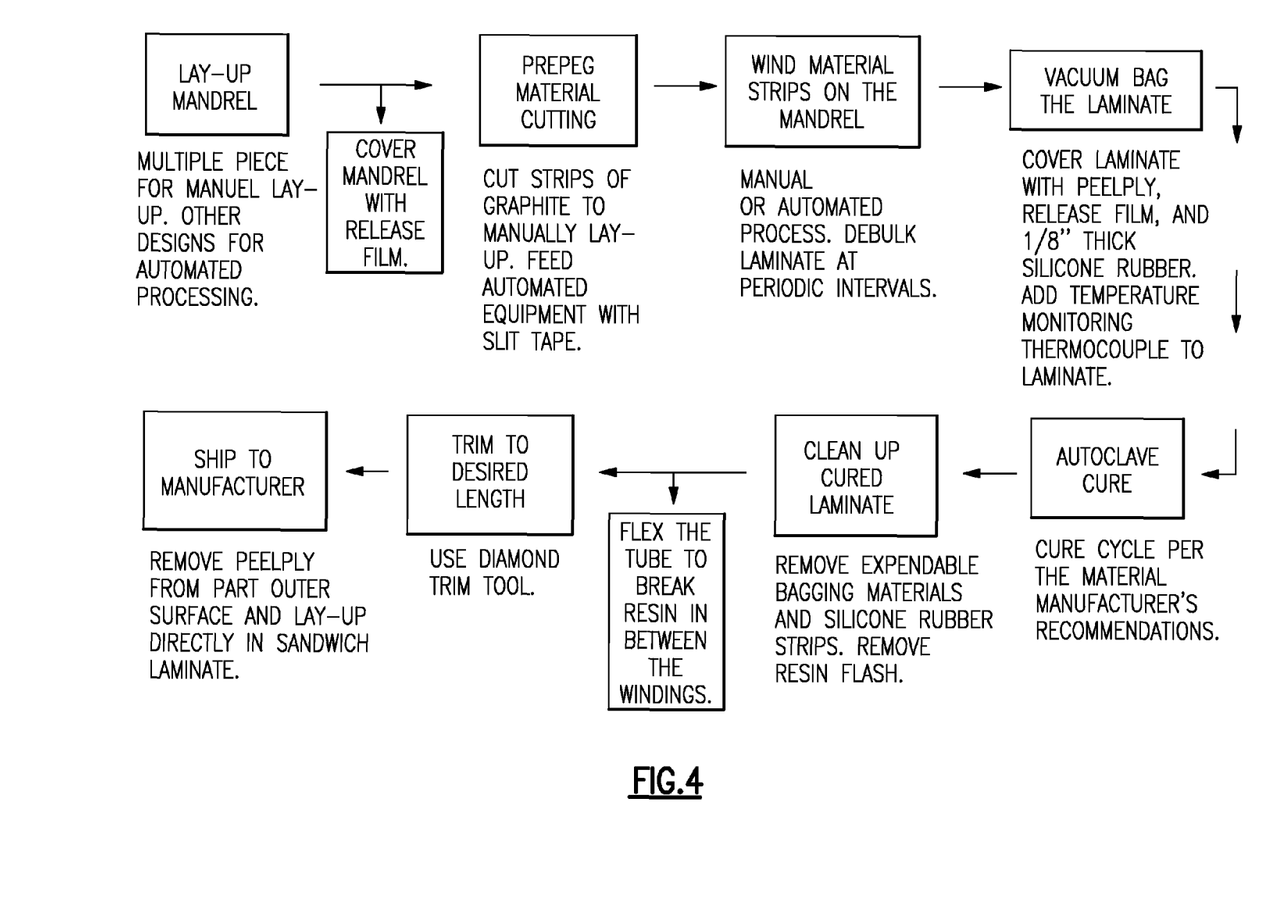
FIG. 4 is a chart illustrating an exemplary reinforcement tube manufacturing process flow.

The generally helical opening 25 may become partially filled with resin from manufacture. The resin which at least partially fills the generally helical opening 25 readily breaks away when the reinforcement tube 24 is flexed (FIG. 2B). That is, even if the generally helical opening 25 may be partially filled with cured resin, flexing of the reinforcement tube 24 results in break-away of the resin and a flexible reinforcement tube 24.

Figure 6A:
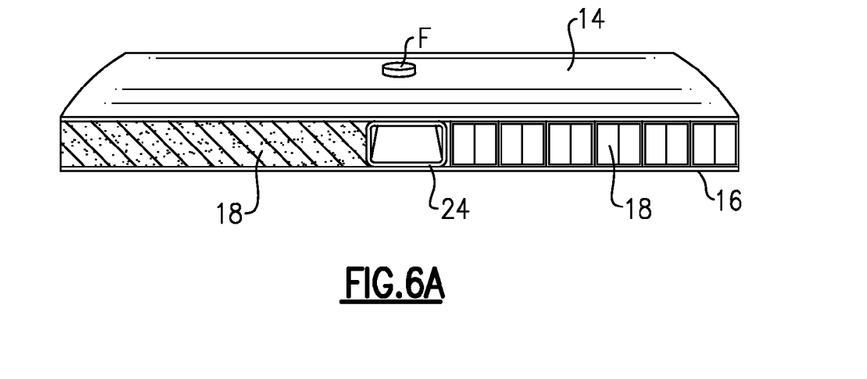
FIG. 6A is a cross-sectional view of a composite panel with a hollow reinforcement tube bonded therein.

The reinforcement tube 24 may be manufactured as continuous commodity-type material then cut to length ready to bond into a sandwich laminate (FIG. 6A) or the desired composite article 10. That is, the reinforcement tube 24 may be manufactured in an automated manner to provide significant lengths of particular size, wall thickness, lay-up and other configurations according to load requirements then need only be later cut to length.

Figure 6B:
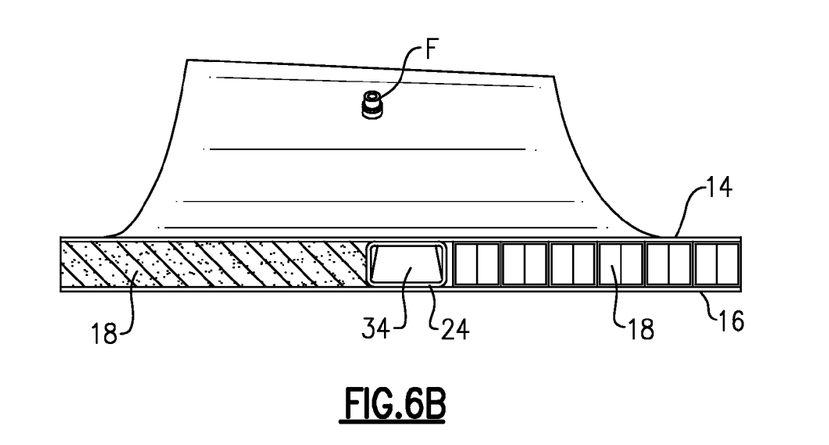
FIG. 6B is a cross-sectional view of a composite panel illustrating a reinforcement tube which has been filled with a lightweight expanding foam so as, e.g., to minimize ingress of moisture.

The reinforcement tube 24 may additionally be filled with a relatively lightweight expanding foam 34 injected into an open end of the reinforcement tube 24 (FIG. 6B), e.g., to minimize the potential of moisture collection. In one non-limiting embodiment, the lightweight expanding foam 34 may be less than 8.0 pcf after expansion. Furthermore, the expanding foam 34 utilized to fill the reinforcement tube 24 may alternatively or additionally be foaming adhesive 26 to both fill the reinforcement tube 24 and expand through the generally helical opening 25 to bond the reinforcement tube 24 to the core 18. The expanding foam 34 and/or foaming adhesive 26 further fixes the reinforcement tube 24 into the installed position. That is, the multi-directional flexibility of the reinforcement tube 24 becomes essentially rigid when the expanding foam 34 and/or the foaming adhesive 26 are/is cured.

In another non-limiting embodiment, the reinforcement tube 24 may additionally be filled with a precast foam 34 which may be slid into an open end of the reinforcement tube 24. In this non-limiting embodiment, the precast foam 34 may be approximately 2.0 pcf.

Figure 7A:
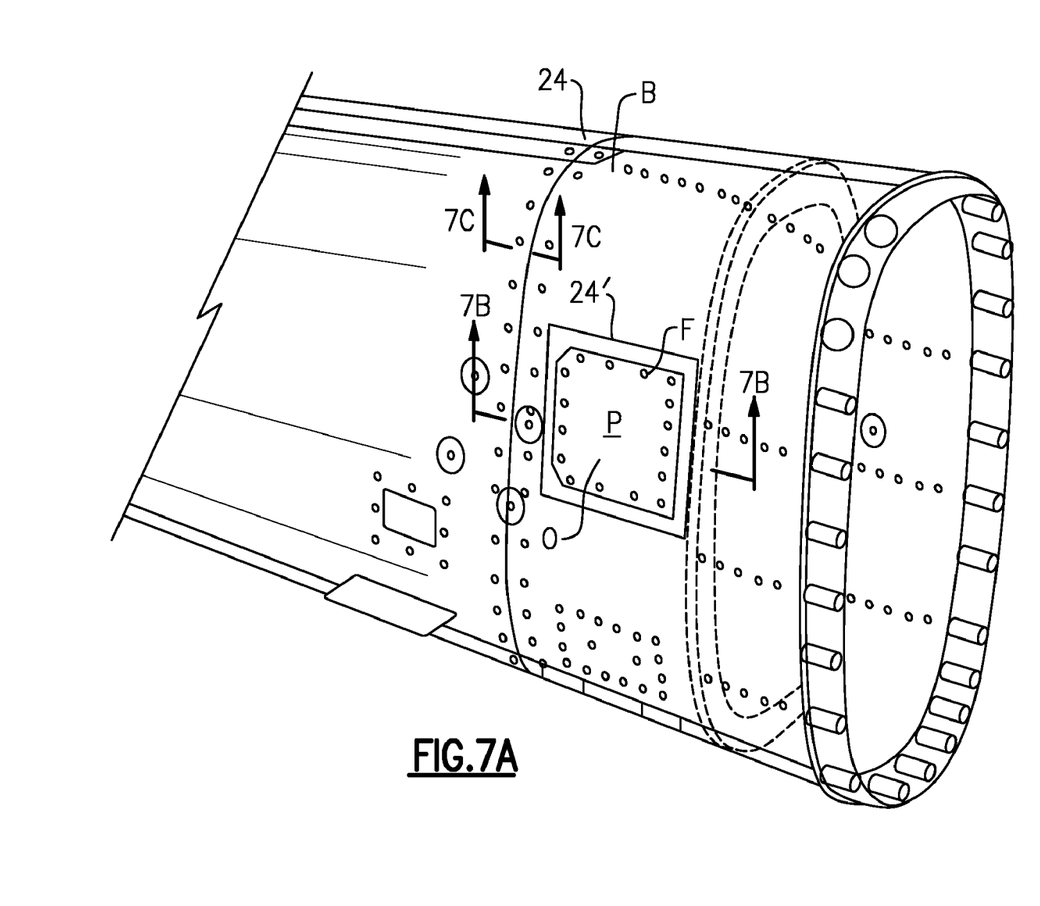
FIG. 7A is a perspective partial phantom view of a structure manufactured with composite panels according to an exemplary embodiment of the present invention.
Figure 7B:
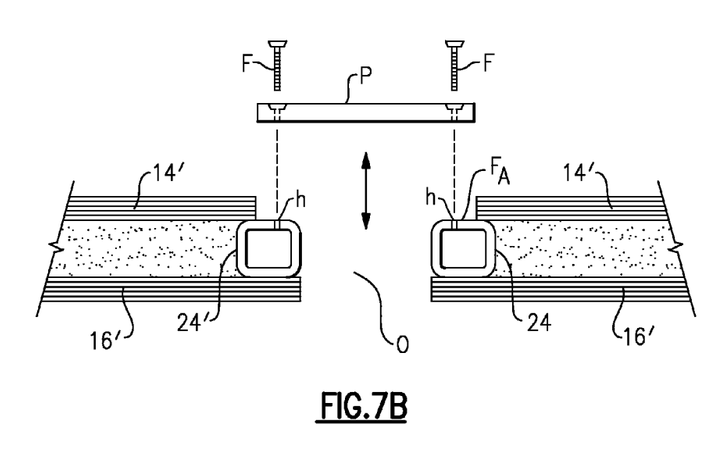
FIG. 7B is a sectional view of an access panel taken along line 7B-7B in FIG. 7A illustrating a flush mount access panel arrangement.

Referring to FIG. 7A, a reinforcement tube 24' may provide for a continuous densification solution at a bulkhead, frame location, or other localized densification area. A multiple of reinforcement tubes 24' may be utilized to, in one disclosed embodiment, frame an opening O which receives a removable access panel P. The multiple of reinforcement tubes 24' extend from the skins 14', 16' to facilitate flush mounting of the access panel P adjacent the skin 14' (FIG. 7B). A multiple of fastener apertures $F_A$ are located through the panel P and the multiple of reinforcement tubes 24' such that the panel P is removably mountable thereto.

Figure 7C:
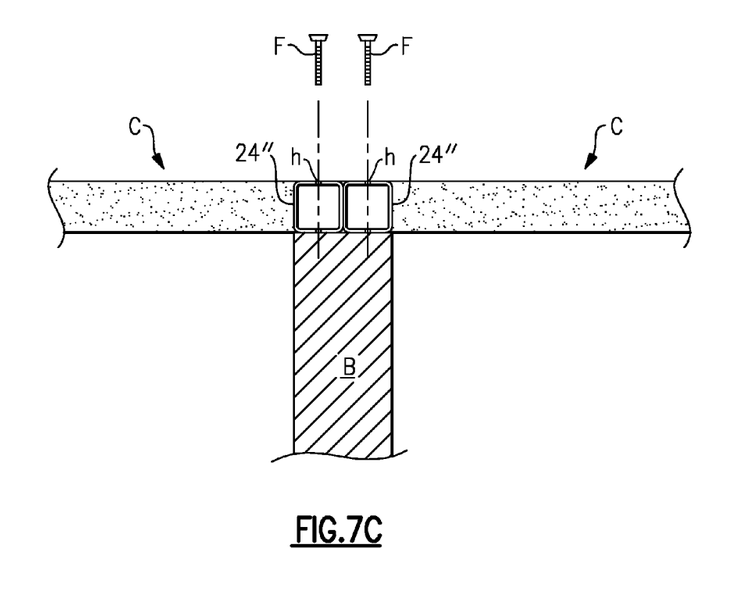
FIG. 7C is a cross-sectional view of a composite panel arrangement taken along line 7C-7C in an abutted relationship as mounted to a bulkhead in the structure of FIG. 7A.

Composite panels C with edge densification provided by reinforcement tubes 24" may, for example, be mounted directly to a bulkhead B or such like with through fasteners F (FIG. 7C).

The reinforcement tube 24 of the exemplary non-limiting embodiments disclosed herein may provide an approximately 50 percent weight savings over 45 lbs. per cu. ft. (pcf) epoxy syntactic; may eliminate labor intensive honeycomb core densification for fastener installation; may allow fastener sizes beyond vertical pin densification limits; may facilitate fastener pitch change and fastener repositioning without costly rework; and may eliminate skin build-up requirements.

It should be appreciated that composite articles may include many different types of non-planar articles and planar articles such as panels used in fixed wing aircraft, ground transportation vehicles, etc and that various panel sizes, layer combinations and depth of layers may be utilized and specifically tailored to provide the desired panel.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention. Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A composite panel comprising:
   a core;
   a reinforcement tube in a coiled configuration, wherein said reinforcement tube provides multidirectional flexibility; and
   a composite skin bonded to said core and said reinforcement tube.

2. The panel as recited in claim 1, wherein said core includes a carrier.

3. The panel as recited in claim 1, wherein said reinforcement tube includes at least one composite ply material strip.

4. The panel as recited in claim 1, wherein said reinforcement tube is rectilinear in cross-section.

5. The panel as recited in claim 1, wherein said coiled configuration defines a helical opening.

6. The panel as recited in claim 1, wherein said composite skin is film bonded to said core and said reinforcement tube.

7. A composite panel comprising:
   a core including a honeycomb material;
   a reinforcement tube in a coil configuration; and
   a composite skin bonded to said core and said reinforcement tube.

8. A composite panel comprising:
   a core including a carrier and a plurality of pins within said carrier;
   a reinforcement tube in a coil configuration; and
   a composite skin bonded to said core and said reinforcement tube.

9. A composite panel comprising:
   a core;
   a reinforcement tube in a coil configuration;
   a composite skin bonded to said core and said reinforcement tube; and
   an expanding foam that at least partially fills said tube.

10. A composite panel comprising a core;
    a reinforcement tube in a coil configuration; and
    a composite skin bonded to said core and said reinforcement tube, wherein said reinforcement tube is foam bonded to said core.

11. A composite panel comprising:
    a core;
    a reinforcement tube in a coiled configuration bonded to said core;
    an expanding foam that at least partially fills said tube; and
    a composite skin bonded to said core and said reinforcement tube.

12. The panel as recited in claim 11, wherein said composite skin is film bonded to said core and said reinforcement tube.

13. The panel as recited in claim 11, wherein said reinforcement tube includes at least one composite ply material strip in a coiled configuration.

* * * * *